United States Patent [19]
Yuyama

[11] Patent Number: 5,483,574
[45] Date of Patent: Jan. 9, 1996

[54] COMMUNICATION TERMINAL EQUIPMENT

[75] Inventor: Osamu Yuyama, Chiba, Japan

[73] Assignee: Sharp Kabushiki Kaisha, Osaka, Japan

[21] Appl. No.: 884,135

[22] Filed: May 18, 1992

[30] Foreign Application Priority Data

May 20, 1991 [JP] Japan .................. 3-114892

[51] Int. Cl.$^6$ .............. H04M 1/24; H04M 3/22; H04M 9/00; H04B 1/16
[52] U.S. Cl. .............. 379/32; 379/2; 379/26; 379/28; 379/387; 379/413; 455/127; 455/343
[58] Field of Search .................. 379/2, 26, 28, 379/32, 387, 413; 455/127, 343

[56] References Cited

U.S. PATENT DOCUMENTS

| | | | |
|---|---|---|---|
| 4,459,437 | 7/1984 | Gabry | 379/26 |
| 4,509,201 | 4/1985 | Sekigawa | 379/387 |
| 4,790,002 | 12/1988 | D'Agosto, III et al. | 379/387 |
| 4,800,589 | 1/1989 | Siligoni et al. | 379/387 |
| 4,825,349 | 4/1989 | Marcel | 379/413 |
| 4,916,735 | 4/1990 | Iida et al. | 374/387 |
| 4,961,222 | 10/1990 | Johansson et al. | 379/413 |
| 4,998,271 | 3/1991 | Tortola et al. | 379/32 |
| 5,032,819 | 7/1991 | Sakuragi et al. | 379/413 |
| 5,063,563 | 11/1991 | Ikeda et al. | 379/32 |
| 5,144,441 | 9/1992 | Sparks | 455/343 |
| 5,144,544 | 9/1992 | Jenneve et al. | 379/413 |
| 5,170,490 | 12/1992 | Cannon | 455/343 |

Primary Examiner—Stephen Chin
Assistant Examiner—Vijay Shankar

[57] ABSTRACT

A telephone set includes an audio system circuit and a data system circuit connected to a data terminal equipment having a data communication function in and an oral communication function. The telephone set includes a power supply circuit connected to a switching system through a telephone line and a current limiting portion for controlling connection between the data system circuit and the power supply circuit. When connection between the telephone set and the switching system is established through the line, power supply to the telephone set from the switching system through the line. The power is only supplied to the telephone set only via the line and the supplied power is further provided separately to the audio system circuit and the data system circuit through the power supply circuit. After the line connection is established, if a short-circuit occurs in the data terminal equipment, the current limiting portion cuts off a power supply path from the power supply circuit to the data system circuit. In this instance, only the power supply to the data system circuit is cut off. Power supply to the audio system circuit is maintained so that the oral communication function is not disabled and the availability of the telephone set is enhanced.

10 Claims, 3 Drawing Sheets

COMMUNICATION TERMINAL EQUIPMENT

BACKGROUND OF THE INVENTION

1. Field of the Invention

The present invention generally relates to communication terminal equipment and, more particularly, relates to communication terminal equipment which is driven by power supplied through a communication line after communication between a switching system and the communication terminal equipment is established through the communication line.

2. Description of the Background Art

Generally, a telephone set has so far been adapted to be driven by power supplied only from a telephone line connected thereto.

FIG. 3 is a schematic diagram showing a structure of a conventional telephone set to which a data terminal equipment can be connected.

In the figure, a telephone set 6 is connected to a switching system 1 through a telephone line 4 and further connected to a data terminal equipment 3 through a terminal connecting cable 5. Switching system 1 supplies power to each telephone set connected thereto through line 4, and also is required for driving the telephone set as well as controlling communication connection between a telephone set and another telephone set through line 4. Telephone set 6 is driven by power supplied only from switching system 1 through telephone line 4. Telephone set 6 includes a power supply circuit 21, an audio system circuit 22 for transmitting/receiving an audio signal and a data system circuit 24 for transmitting/receiving data. Data terminal equipment 3 such as a microcomputer having a function of transmitting/receiving data is connected to data system circuit 24 through terminal connecting cable 5. Terminal equipment 3 transmits/receives data to/from data system circuit 24. Power supply circuit 21 supplies power provided from connecting line 4 connected thereto to audio system circuit 22 and data system circuit 24 connected to the subsequent stage.

In the operation of telephone set 6 shown in FIG. 3, when line connection between telephone set 6 and switching system 1 is established through telephone line 4 and communication with another telephone set is made possible, then switching system 1 starts providing power to telephone set 6. The power is supplied to audio system circuit 22 and data system circuit 24 from power supply circuit 21. Audio system circuit 22 receives the power supplied from power supply circuit 21, transmits/receives an audio signal through telephone line 4 to carry out its talking process. Data system circuit 24 receives the power supplied from power supply circuit 21, controls transmission/reception of data between telephone line 4 and data terminal equipment 3, and further carries out data conversion and so on so that the data can be processed in data terminal equipment 3.

As described above, telephone set 6 shown in FIG. 3 receives the power supplied only from telephone line 4 and can carry out the talking processing and a data communication processing for data terminal equipment 3 at the same time. Since telephone set 6 can supply driving power to data system circuit 24 and audio system circuit 22 only with the power supplied from telephone line 4, it is not necessary to connect telephone set 6 to another power supply through an AC power adapter and so on, so that, advantageously, the requirement of an interconnection for that part can be saved and a decrease of cost can also be realized.

As described above, the power required for driving telephone set 6 is supplied only from switching system 1 through telephone line 4. As switching system 1 can supply a predetermined amount of power, a maximum level of power which can be supplied to each telephone set connected to switching system 1 is determined for itself. Accordingly, if a problem such as a short-circuit occurs inside circuit 24 of telephone set 6 or in a connector (not shown) connecting circuit 24 to terminal equipment 3, the amount of the power supplied from switching system 1 via telephone line 4 exceeds the above-mentioned maximum power level, doing damage to the function of circuit 24 or terminal equipment 3. In order to avoid such a damage before it happens, switching system 1 is adapted to stop supplying power to telephone set 6 on detecting the amount of power supply exceeding the above-mentioned maximum power level. That is, in the conventional telephone set 6, if a problem such as a short-circuit occurs inside data system circuit 24 or in, a connector connecting circuit 24 to terminal equipment 3 and so on, the power required for driving telephone set 6 is immediately cut off. There was a problem that when the driving power itself was cut off, not only the function of transmitting/receiving data on the side of data system circuit 24 but also talking by voice on the side of audio system circuit 22, where no problem had occurred, could not be carried out, so that the availability of telephone set 6 was significantly decreased.

This is a problem to be considered particularly for telephone set 6 having data system circuit 24 as well as circuit 22 compared with a normal telephone set having audio system circuit 22 only because the cause of the trouble in data system circuit 24 built in telephone set 6 is rather more significant in data terminal equipment 3 connected to telephone set 6 and connecting cable 5 used for connection with data terminal equipment 3 than in telephone set 6 itself.

SUMMARY OF THE INVENTION

An object of the present invention is to provide communication terminal equipment driven by power supplied only from a communication line connected thereto, which selectively cuts off the power supply only for a specific portion in the equipment when a specific event has occurred, instead of the whole equipment.

In order to achieve the object above, the communication terminal equipment according to the present invention is connected to a communication line. The equipment includes a first processing portion for transmitting/receiving a first signal through the line and a second processing portion for transmitting/receiving a second signal other than the first signal through the line, the first and second processing portions being driven by the power supplied only from the line. According to the communication terminal equipment, when occurrence of the specific event is detected for which the power supply from the line should be cut off in the second processing portion for transmitting/receiving the second signal, the power supply to the second processing portion is only cut off, so that the power is still supplied in a stable manner from the line to the first processing portion for transmitting/receiving the first signal to ensure its operation. Upon indication that the specific event has been eliminated, the power supplied from the communication line is resumed. Accordingly, since the communication terminal equipment operates so as to selectively cut off the power supply from the line only for the specific portion, i.e., the second processing portion instead of the whole equipment according to the occurrence of the specific event, the communication function using the first signal in the terminal equipment is not disabled even when the specific event occurs. Accordingly, overall, the availability of the terminal equipment is enhanced.

In another aspect of the present invention, the communication terminal equipment is a telephone set and the communication line is a telephone line for transmitting an audio signal as the first signal. Even when a specific event occurs in the second processing portion stated above, the function of the first processing portion in the telephone set, i.e., a talking function using the audio signal above is not disabled, so that the capability of the telephone set of providing a basic service (talking function) can be maintained in a stable manner.

BRIEF DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The foregoing and other objects, features, aspects and advantages of the present invention will become more apparent from the following detailed description of the present invention when taken in conjunction with the accompanying drawings, which are given by way of illustration only and thus are not limitative of the present invention and wherein.

DESCRIPTION OF THE PREFERRED EMBODIMENTS

One embodiment of the present invention will now be described in detail with reference to the drawings. Although a telephone set having a data transmitting/receiving function is shown as an example of a communication terminal equipment in this embodiment, the communication terminal equipment is not limited to the telephone set. That is, it is applicable to any communication terminal equipment to which power is supplied only from a communication line connected thereto, having separately functions for transmitting/receiving two or more kinds of signals. Signals to be transmitted/received are not limited to an audio signal and data, though they are shown as examples here. For example, a video signal or the like may be included. Furthermore, although a telephone line is illustrated as a communication line, the communication line is not limited to this. That is, there may be employed any communication line capable of supplying power to a communication terminal equipment connected thereto, which is required for driving the equipment.

Figure 1A:
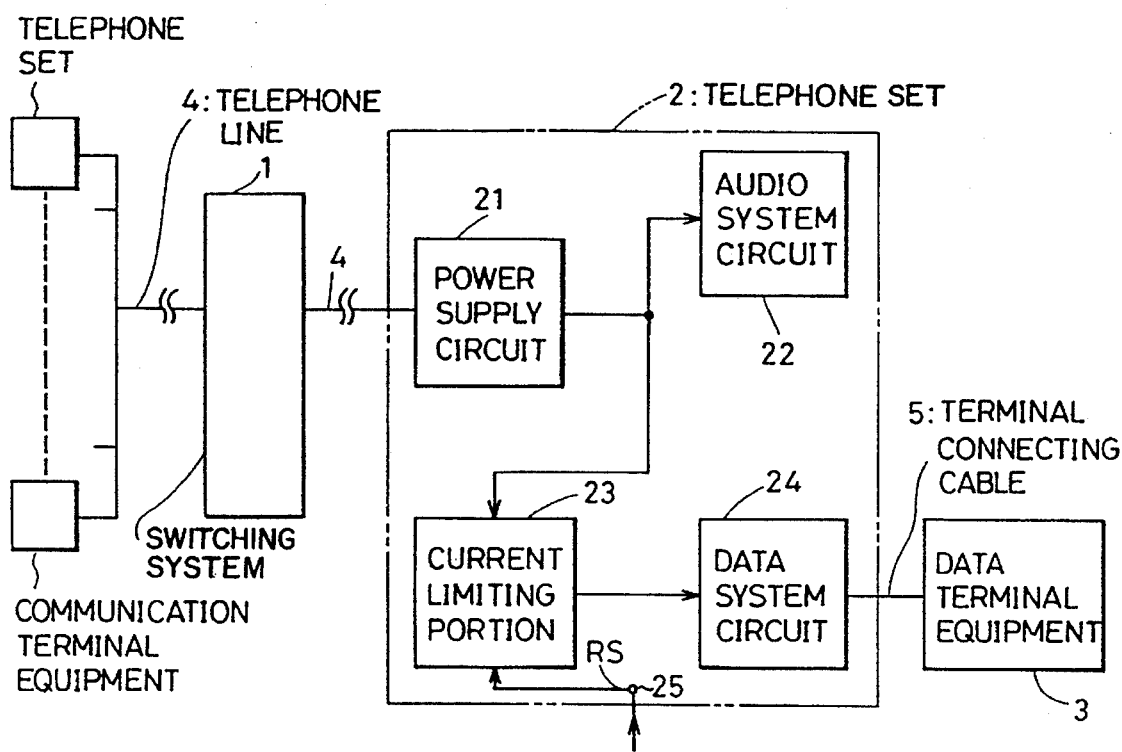
FIGS. 1A and 1B are schematic diagrams showing a structure of a telephone set according to one embodiment of the present invention, to which data terminal equipment can be connected.

FIGS. 1A and B are schematic diagrams showing a structure of a telephone set according to one embodiment of the present invention, to which data terminal equipment can be connected.

Figure 3:
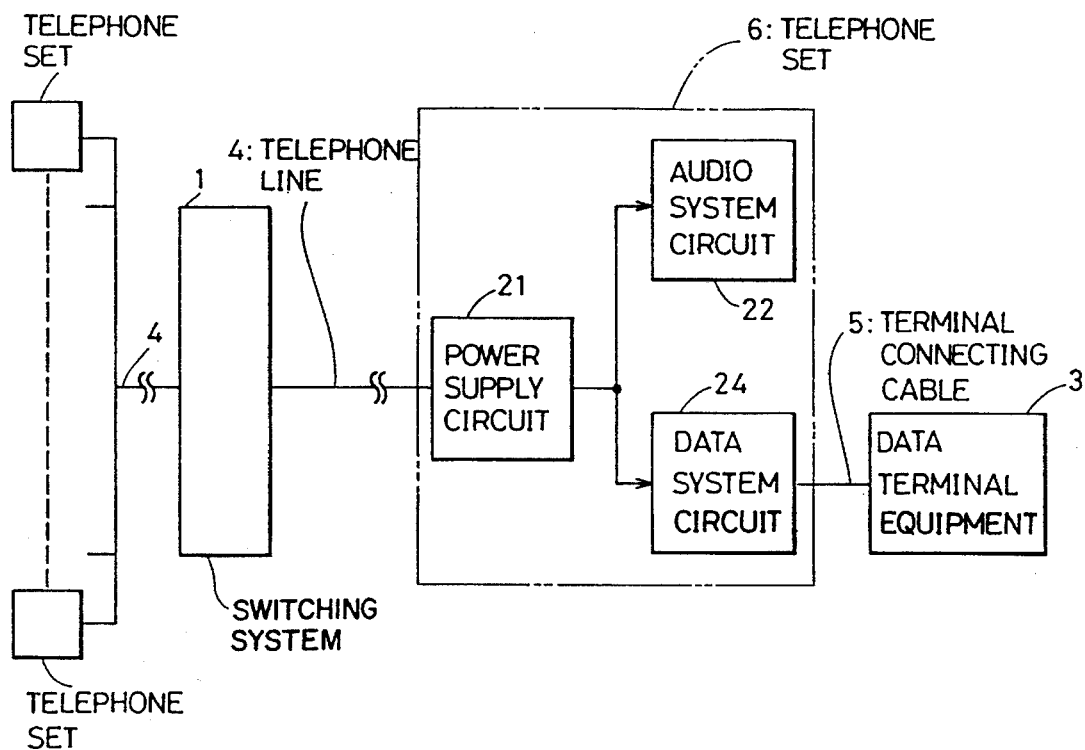
FIG. 3 is a schematic diagram showing a structure of a conventional telephone set to which data terminal equipment can be connected.

In FIG. 1A, a telephone set 2 is connected to a switching system 1 through a telephone line 4 and connected to data terminal equipment 3 through a terminal connecting cable 5. Switching system 1 supplies to each telephone set connected thereto power required for driving the same as well as controls communication connection with communication terminal equipment including telephone set 2 and other telephone sets through lines 4. Power required for driving telephone set 2 is supplied to the same only from switching system 1 through telephone line 4. Telephone set 2 includes a power supply circuit 21, an audio system circuit 22 and a data system circuit 24 connected to data terminal equipment 3 through terminal connecting cable 5 as described with reference to FIG. 3. Telephone set 2 further includes a current limiting portion 23 and an external terminal 25. Current limiting portion 23 controls electrical connection between power supply circuit 21 and data system circuit 24.

In accordance with telephone set 2 constructed as described above, when line connection with switching system 1 is established through telephone line 4, power required for driving telephone set 2 is supplied from switching system 1 through line 4 and, correspondingly, power supply circuit 21 supplies the power to data system circuit 24 through current limiting portion 23 as well as supplies the power to audio system circuit 22. On receiving the power supply, audio system circuit 22 operates so as to enable talking processing which is an original function of telephone set 2. On receiving the power supply, data system circuit 24 operates so as to enable data transmission/reception to/from data terminal equipment 3 and communication-connects data terminal equipment 3 to telephone line 4. Accordingly, when connection with switching system 1 through line 4 is established, telephone set 2 operates so as to enable data transmission/reception to/from data terminal equipment 3 through data system circuit 24, not to mention, talking by audio system circuit 22.

A description will now be made of the structure and operation of current limiting portion 23.

Figure 1B:
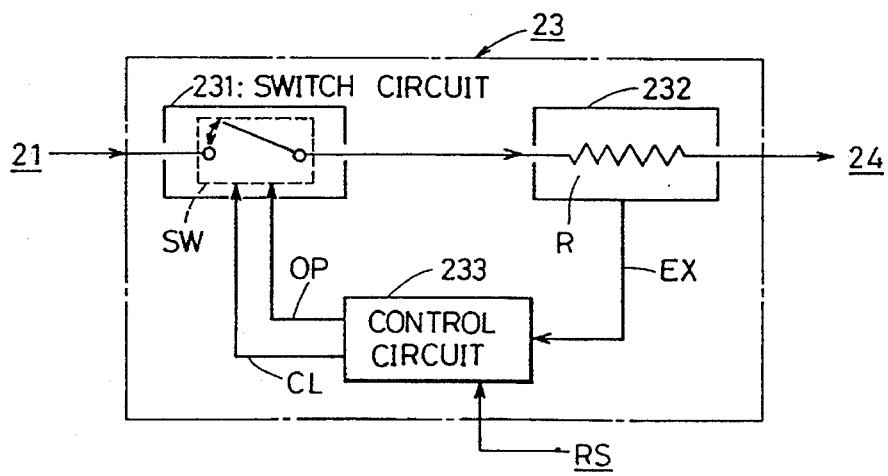

FIG. 1B is a schematic diagram showing the structure of current limiting portion 23.

Referring to FIG. 1B, current limiting portion 23 includes a switch circuit 231, a current monitor circuit 232 and a control circuit 233. Switch circuit 231 includes a switch SW, the opening and closing operations of which are controlled according to a switch open signal OP and a switch close signal CL. Though switch SW is normally closed, when the signal OP is supplied, then it is opened, cutting off a power supply path from power supply circuit 21 to data system circuit 24. Conversely, when the signal CL is supplied, then it is closed, establishing the power supply path from circuit 21 to circuit 24. Current monitor circuit 232 includes a resistor R. Resistor R connects in series between circuit 21 and circuit 24 through switch circuit 231. Circuit 232 always monitors the voltage drop value in resistor R and, if a further voltage drop occurs exceeding a predetermined voltage drop value, it determines that an abnormal event has occurred on the side of the load (in this case, on the side of data system circuit 24) and accordingly supplies a current abnormality signal EX to control circuit 233. When control circuit 233 receives the current abnormality signal EX from current monitor circuit 232, then it supplies a switch open signal OP to switch circuit 231. Therefore, if the current abnormality signal EX is supplied by current monitor circuit 232, switch SW of switch circuit 231 is set in the open state. Accordingly, when the current abnormality signal EX is supplied, the power supply from power supply circuit 21 to data system circuit 24 is cut off.

After control circuit 233 supplies the switch open signal OP in response to the current abnormality signal EX being input and brings switch SW to the open state, circuit 232 periodically repeats supplying of the current abnormality signal EX, so that switch SW also periodically repeats its opening and closing operations. In order to stop the repeated opening and closing operations of switch SW and forcibly bring switch SW to the closed state, a reset signal RS is externally, for example, manually, supplied to control circuit 233 through terminal 25. As a result, control circuit 233 supplies a signal CL for stopping the repeated opening and closing operations of switch circuit 231 and bringing switch circuit 231 to the closed state. Accordingly, if a user eliminates the trouble on the side of data system circuit 24 and then supplies the reset signal RS, switch SW is brought to the closed state by the signal CL and supplying power from power supply circuit 21 to data system circuit 24 is rendered possible again.

As described above, current limiting portion 23 monitors the amount of the current supplied to the side of data system circuit 24 and, if an abnormal event occurs where more current is about to be supplied exceeding a predetermined amount, immediately stops supplying the current from power supply circuit 21 to data system circuit 24. Such an abnormal event on the side of data system circuit 24 that results in the current abnormality signal EX being supplied as an output is caused by a problem such as a short-circuit in data system circuit 24 or data terminal equipment 3, or a short-circuit in a connector including terminal connecting cable 5 connecting data system circuit 24 and data terminal equipment 3.

The operation of telephone set 2 shown in FIG. 1 will now be described.

Suppose that switch SW is how in the closed state.

When connection between telephone set 2 and switching system 1 is established through telephone line 4, supplying power necessary for driving telephone set 2 is started from switching system 1 to telephone set 2 through telephone line 4. Telephone set 2 supplies the power to audio system circuit 22 and data system circuit 24 through power supply circuit 21. As a result, audio system circuit 22 carries out the talking function which is the original function of telephone set 2 while data system circuit 24 transmits data to telephone line 4 from data terminal equipment 3 or receives data from telephone line 4. Now suppose that a short-circuit occurs in data system circuit 24, or a short-circuit arises in the connector connecting data system circuit 24 and data terminal equipment 3.

When the trouble occurs, as current monitor circuit 232 of current limiting portion 23 detects the voltage drop value exceeding the predetermined value as described above, it determines that a problem has occurred for which the current should not be supplied on the side of data system circuit 24 and, correspondingly, supplies the current abnormality signal EX to control circuit 233. Control circuit 233 supplies the switch open signal OP in response to the input of the signal EX and opens switch SW which has been in the closed state. The current supply path from power supply circuit 21 to data system circuit 24 is thereby cut off, so that a recovery processing for the trouble is rendered possible in data system circuit 24. Meanwhile, when the trouble occurs, the power can still be supplied to audio system circuit 22 through telephone line 4 and power supply circuit 21 in a stable manner.

After the trouble is eliminated on the side of data system circuit 24 and circuit 24 is restored to its normal state, a reset signal RS is externally supplied to circuit 233 through terminal 25 in order to resume power supply to the side of data system circuit 24. Circuit 233 through terminal 25 supplies a switch close signal CL in response to the input of the signal RS. Switch SW is closed in response to the signal CL being input and the power supply path from power supply circuit 21 to the side of data system circuit 24 is reestablished, so that the normal data communication process can be started again.

As described above, telephone set 2 has the power supply function divided for data system circuit 24 and audio system circuit 22 provided therein and further has current limiting portion 23 added to the power supply function on the side of data system circuit 24. Accordingly, even if a problem occurs for which the power should be cut off on the side of data system circuit 24, the power to the side of data system circuit 24 within telephone set 2 is only cut off by current limiting portion 23 and stable power supply to the side of audio system circuit 24 is continued. Accordingly, although there are provided audio system circuit 22 for voice talking and data system circuit 24 for data communication within telephone set 2 the original function (talking function) of telephone set 2 is not disabled even if some kind of current abnormal event is caused on the side of data system circuit 24.

Figure 2:
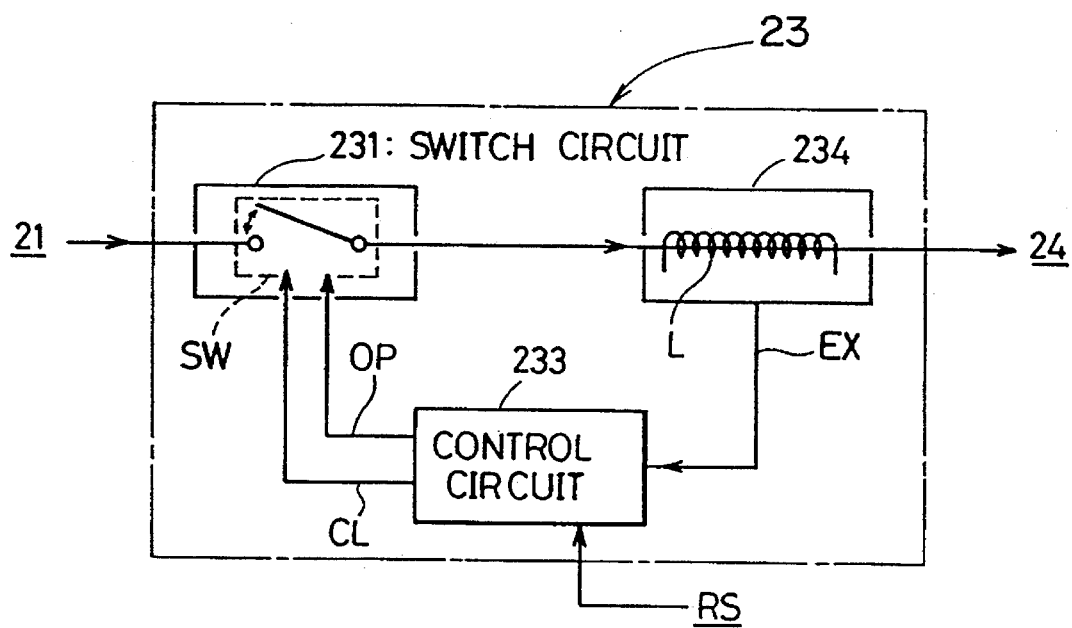
FIG. 2 shows schematic structure of the current limiting portion in accordance with another embodiment of the present invention.

FIG. 2 shows schematic structure of current limiting portion 23 in accordance with another embodiment of the present invention. Current detecting circuit 232 of current limiting portion 23 of FIG. 1B detects current value based on potential difference at both ends of resistance R and outputs a signal EX in response. The same function can be obtained by using, instead of the limiting portion 23, the current limiting portion 26 including a current detecting circuit 234 such as shown in FIG. 2.

As shown in FIG. 2, current limiting portion 26 includes circuit 234 which includes a coil L wound around a lead for supplying current to the side of circuit 24. When current flows to the lead, a potential is generated because of electromagnetic induction, and therefore, the current value flowing to the side of the circuit 24 through the lead may be detected based on the detected potential to provide the signal EX to the circuit 233 in response.

Although current limiting portion 23 is only provided on the side of data system circuit 24 in the embodiment described above, similarly, it may be provided on the side of audio system circuit 22 to control disconnection/connection of the power supply path between power supply circuit 21 and audio system circuit 22.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication terminal equipment, connected to a communication line, including first processing means for transmitting/receiving a first signal through said communication line and second processing means for transmitting/receiving a second signal different than said first signal through said communication line, said first and second processing means being driven by power supplied from said communication line, the communication terminal equipment comprising:

detection means for detecting a specific event occurring for which the supplied power to said second processing means should be cut off;

power supply cutoff means, responsive to the detection of said specific event by said detection means, for cutting off the supplied power to said second processing means; and power supply resumption means, responsive to an externally applied signal indicative that said specific event has been eliminated after cutting off of the supplied power by said power supply cutoff means, for resuming the supplied power to said second processing means.

2. The communication terminal equipment according to claim 1, wherein said specific event is a state where an overcurrent flows in said second processing means.

3. The communication terminal equipment according to claim 1, wherein the communication terminal equipment is a telephone set including audio processing means in said first processing means and said communication line is a telephone line for transmitting an audio signal as said first signal.

4. The communication terminal equipment according to claim 1, wherein said second signal includes a data signal and said second processing means includes transmission/reception processing means for said data signal.

5. The communication terminal equipment according to claim 4, wherein said second processing means further includes data processing means for processing data based on said data signal transmitted/received by said transmission/reception processing means.

6. A communication terminal equipment, connected to a communication line, including a plurality of processing means for transmitting/receiving a signal through said communication line, said plurality of processing means being driven by power supplied from said communication line, the communication terminal equipment comprising:

detection means for detecting occurrence of a specific event for which the supplied power to a specific one of said plurality of processing means should be cut off; and power supply cutoff means, responsive to a detection output of said detection means indicative of occurrence of the specific event, for cutting off the supplied power only to the specific one of said plurality of processing means, said power supply cutoff means comprising control means, coupled to said detection means, for generating a first signal responsive to receipt of said detection output for directing cut off of the supplied power and a second signal responsive to receipt of an externally provided signal indicative that the specific event has been eliminated for directing resumption of the supplied power, and a switch, operatively coupled in series between said communication line and said detection means, for cutting off the supplied power from said communication line upon receipt of said first signal and for resuming the supplied power upon receipt of said second signal.

7. A communication terminal apparatus having first and second processing means for respectively transmitting/receiving first and second signals over a communication line, operating power being supplied to the communication terminal apparatus through the communication line, the communication terminal apparatus comprising:

power supply means, coupled to the communication line, for outputting the operating power respectively for said first and second processing means; and current limiting means, coupled between said power supply means and said second processing means, for selectively supplying the operating power to said second processing means, said current limiting means having switching means including a first terminal coupled to the operating power output said power supply means and a second terminal, monitor means, coupled between the second terminal of said switching means and said second processing means, for generating and outputting an abnormality signal upon the occurrence of an abnormal event in said second processing means, and control means, coupled to said switching means, for switching said switching means to an open position upon receipt of the abnormality signal and for maintaining said switching means in a closed position otherwise, said control means having a reset terminal for receiving a reset signal indicative that the abnormal event no longer exists, said control means switching said switching means to the closed position upon receipt of the reset signal.

8. The communication terminal apparatus of claim 7, wherein said monitor means comprises a resistor, the abnormality signal being output when said monitor means determines that a voltage drop across said resistor exceeds a predetermined value.

9. The communication terminal apparatus of claim 7, wherein said monitor means comprises a coil, the abnormality signal being output when said monitor means determines that a potential across said coil exceeds a predetermined value.

10. The communication terminal apparatus of claim 7, wherein the communication line is a telephone line, said first processing means comprises a telephone unit and the first signals are audio signals and wherein said second processing means comprises data processing means and the second signals are data signals.

\* \* \* \* \*